United States Patent
Booth, III et al.

(10) Patent No.: US 7,593,398 B2
(45) Date of Patent: Sep. 22, 2009

(54) LAYER-TWO INTERWORKING APPLIED TO L2-L3 PSEUDOWIRES

(75) Inventors: Earl Hardin Booth, III, Raleigh, NC (US); W. Scott Wainner, Potomac Falls, VA (US); W. Mark Townsley, Nashville, TN (US); Christopher Metz, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 586 days.

(21) Appl. No.: 11/221,964

(22) Filed: Sep. 8, 2005

(65) Prior Publication Data

US 2007/0053366 A1    Mar. 8, 2007

(51) Int. Cl.
*H04L 12/28* (2006.01)
*H04J 3/16* (2006.01)
(52) U.S. Cl. .................... 370/389; 370/401; 370/469
(58) Field of Classification Search .......... 370/389, 370/392, 395.5, 400, 401, 410, 465–467, 370/469
See application file for complete search history.

(56) References Cited

U.S. PATENT DOCUMENTS

| | | | |
|---|---|---|---|
| 6,985,488 B2* | 1/2006 | Pan et al. ............... | 370/395.3 |
| 7,010,299 B2 | 3/2006 | Wilson .................. | 455/436 |
| 7,339,929 B2* | 3/2008 | Zelig et al. ............. | 370/390 |
| 2004/0037279 A1* | 2/2004 | Zelig et al. ............. | 370/390 |
| 2005/0213513 A1* | 9/2005 | Ngo et al. .............. | 370/254 |
| 2005/0220014 A1* | 10/2005 | DelRegno et al. ....... | 370/230 |
| 2005/0220022 A1* | 10/2005 | DelRegno et al. ....... | 370/235 |
| 2005/0220059 A1* | 10/2005 | DelRegno et al. ....... | 370/337 |
| 2006/0088033 A1* | 4/2006 | Farid et al. ............. | 370/395.5 |
| 2006/0090008 A1 | 4/2006 | Guichard et al. ........ | 709/246 |
| 2007/0030851 A1* | 2/2007 | Sinicrope et al. ........ | 370/392 |

\* cited by examiner

*Primary Examiner*—Hong Cho
(74) *Attorney, Agent, or Firm*—BainwoodHuang

(57) ABSTRACT

A method and apparatus for performing Layer 2 (L2) interworking is presented. A L2 Protocol Data Unit (PDU) is received at an L2 Switching Entity (SE). The L2 PDU is converted to a normalized Pseudowire (PW) PDU. The normalized PW PDU is then forwarded to a Layer 3 (L3) Routing Entity (RE). The normalized PDU may be in the form of a predetermined L2 protocol or a L2 agnostic protocol.

26 Claims, 3 Drawing Sheets

LAYER-TWO INTERWORKING APPLIED TO L2-L3 PSEUDOWIRES

BACKGROUND

In a typical networking environment used for routing data, the environment may include a number of Customer Edge (CE) routers, a number of Provider Edge (PE) routers and a packet-switched network (PSN). Data, encapsulated in layer-2 frames, may be forwarded from a first CE router to a first PE router, from the first PE router across the PSN to a second PE router, and from the second PE router to a second CE router. A Pseudowire (PW) may be utilized to transfer data across the PSN. A Pseudowire is a mechanism that emulates attributes of a service such as Asynchronous Transfer Mode (ATM), Frame Relay (FR), Point-to-Point Protocol (PPP), High Level Data Link Control (HDLC), Synchronous Optical Network (SONET) Frames or Ethernet over a PSN. The functions provided by the PW include encapsulating Protocol Data Units (PDUs) arriving at an ingress port, carrying them across a path or tunnel, managing their timing and order, and any other operations required to emulate the behavior and characteristics of the particular service. In a particular embodiment, PWs are used to carry ingress layer-2 traffic from an ingress PE router to an egress PE router, and then forward the layer-2 traffic out of an egress port of the egress PE router.

The environment further includes an attachment circuit (AC) which comprises the physical or virtual circuit attaching a CE to a PE. An AC can be a Frame Relay PVC identified by a local Data Link Connection Identifier (DLCI), an ATM PVC identified by a Virtual Path Identifier/Virtual Channel Identifier (VPI/VCI), an ATM port, an Ethernet port, a Virtual Local Area Network (VLAN), a High Level Data Link Control (HDLC) link, a PPP connection on a physical interface, a PPP session from an Layer-2 Tunnel Protocol (L2TP) tunnel, or similar such element.

Reference is made herein to layer-2 and layer-3 devices and data. These terms refer to the standard model for networking protocols and distributed applications, the International Standard Organizations Open System Interconnect (ISO/OSI) model. This model defines seven network layers; a physical layer, a data link layer, a network layer, a transport layer, a session layer, a presentation layer and an application layer.

Layer 2 is referred to as the data link layer and assigns the format of data on the network. The data link layer handles the physical and logical connections to the packet's destination using a network interface. A host connected to an Ethernet would have an Ethernet interface to handle connections to the outside world.

Layer 3 is known as the network layer. Internet Protocol (IP) version 4 or version 6 uses the network layer as a network layer interface. IP version 4 identifies each host with a 32-bit IP address. IP addresses are written as four "dot-separated" decimal numbers between 0 and 255. Some part of the IP address identifies the network and the remaining bits identify a particular host on that network.

In conventional systems, a PDU (e.g., a frame) traverses the networking environment beginning at a first CE router and ending up at a second CE router. MPLS labels are typically used as the forwarding mechanisms between ingress and egress PE devices which link the CE together via a pseudowire (PW). The first CE router sends a layer-2 PDU to an ingress PE router. The ingress PE router receives the PDU and encapsulates the PDU with MPLS labels which are used to identify the individual port/circuit and the egress layer-3 PE router. The encapsulated PDU is then forwarded on the PW, across the packet-switched network, to an egress layer-3 PE router. The egress layer-3 PE router removes the MPLS label that identifies the port/circuit that was added by the ingress PE router and forwards the layer-2 PDU to the second CE router.

A provider may wish to use a PW to connect a Customer Edge (CE) device and a layer-3 Provider Edge (PE) device instead of using a traditional layer-2 circuit. This effectively originates a PW at a layer-2 ingress PE referred to as a L2 switching entity (L2SE) and terminates the PW into a VRF at the layer-3 ingress PE device referred to as a L3 routing entity (L3RE), rather than switching it to a CE device. This has proven useful, in particular when the CE and the PE are in separate administrative domains or the CE is otherwise difficult to update. A similar scheme is described in detail in co-pending application Ser. No. 10/970,014 filed Oct. 1, 2004, the disclosure of which is incorporated by reference in its entirety.

SUMMARY

Conventional mechanisms such as those explained above suffer from a variety of shortcomings. A system which deploys a PW between an L2 switching entity (L2SE) and an L3 routing entity (L3RE), requires the L3 routing entity (L3RE) to be cognizant of all of the L2 encapsulation and signaling mechanisms available on all of the L2SEs it may communicate with. As a result, the functionality of the L3RE is dramatically increased, driving up the cost and complexity of the system.

Embodiments of the invention significantly overcome such shortcomings and provide mechanisms and techniques that provide L2 interworking to be applied to L2-L3 Pseudowires. This is accomplished by providing an interworking function to normalize the L2 attachment circuit into a common PW Type (and associated L2 encapsulation and signaling) that the L3RE can process regardless of the interface type at the L2SE, and the presentation of the normalized PW to the L3RE.

L2 interworking is a methodology for converting one L2 signaling and framing method to another L2 signaling and framing method. By applying these interworking functions on an L2 switching entity (L2SE) associated with an L2-L3 pseudowire, the native L2 framing and signaling is terminated at the L2 switching entity. The L2-interworking function on the L2 switching entity converts the native L2 framing to a normalized framing method suitable for transport of packets across the PW. The interworking also converts the native L2 signaling mechanism to a normalized PW signaling mechanism that synchronizes the state of the L3RE's virtual IP interface representing the local attachment circuit with the state of the L2SE's attachment circuit.

The basic L2-L3 pseudowire operation of the L2SE relies on transparent L2 transport of the customer data frame in the pseudowire. Two enhanced L2 interworking methods may be applied. The first method normalizes the L2 framing to a pseudowire carrying a bridged protocol data unit (BPDU) that may transport multiple L3 protocol types. The second method normalizes the L2 framing to a pseudowire carrying an IP (v4 or v6) framed format. The L3RE uses the virtual interface associated with the pseudowire to decapsulate the normalized PDU frames and forward IP packets based on L3 routing entries.

In a particular embodiment of a method for performing Layer 2 (L2) interworking, a L2 Protocol Data Unit (PDU) is received at an L2 Switching Entity (SE). The L2 PDU is converted to a normalized Pseudowire (PW) PDU. The normalized PW PDU is then forwarded to a Layer 3 (L3) Routing Entity (RE).

Other embodiments include a computer readable medium having computer readable code thereon for performing Layer 2 (L2) interworking. The computer readable medium includes instructions for receiving a L2 Protocol Data Unit (PDU) at a L2 Switching Entity (SE). The computer readable medium further includes instructions for converting the L2 PDU to a normalized Pseudowire (PW) PDU. The computer readable medium also includes instructions for forwarding the normalized PW PDU to a Layer 3 (L3) Routing Entity (RE).

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides L2 interworking to be applied to L2-L3 Pseudowires as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing L2 interworking to be applied to L2-L3 Pseudowires as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
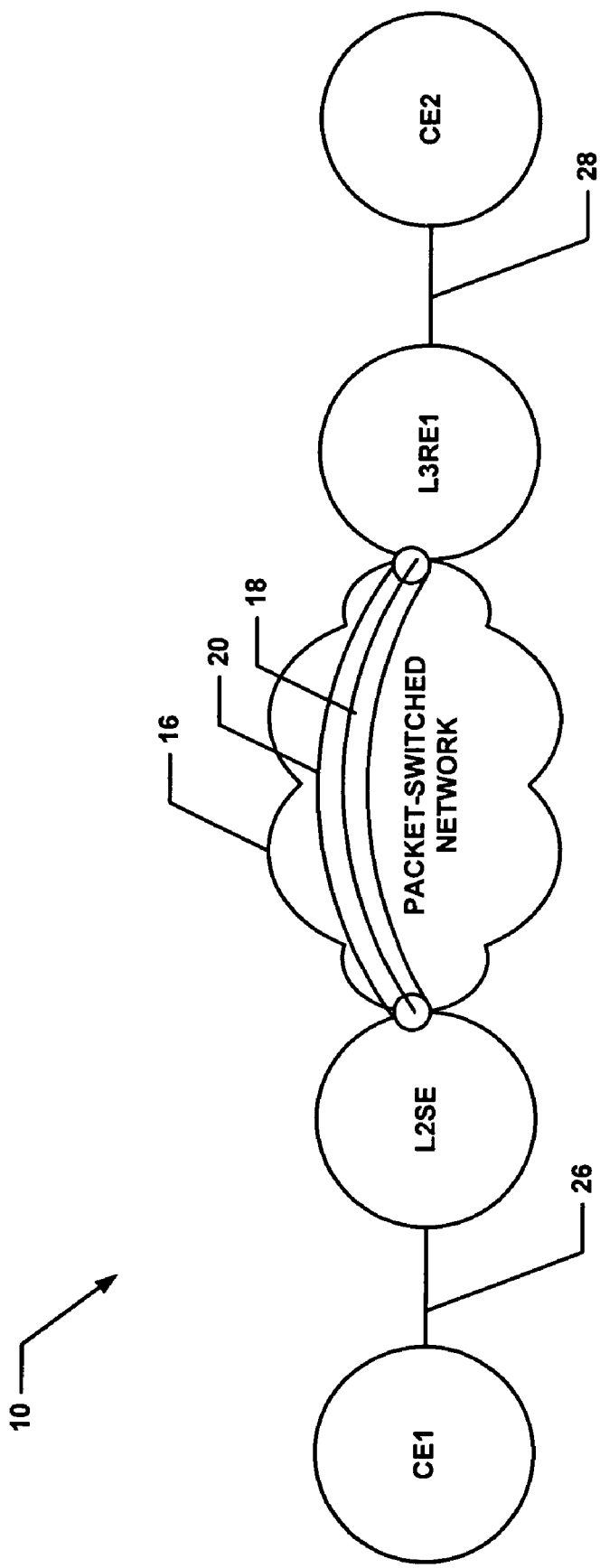
FIG. 1 is a block diagram of an environment utilizing pseudowires that performs Layer 2 interworking in accordance with embodiments of the invention.

Embodiments of the invention are directed to methods and apparatus for performing L2 interworking to be applied to L2-L3 PWs defines a normalized PW signaling and framing mechanism and associated interworking functions for various L2 PDUs. The signaling and framing interworking function applied at the L2SE allows the pseudowire to transport a normalized frame that may be processed on the L3RE. The interworking function is performed at the L2SE, frames are transported across the PW in a normalized manner, and terminated into an L3RE which routes IP packets based on a given VRF or global routing table Embodiments of the invention reduce the complexity of the L3RE by eliminating the need to emulate the myriad of possible L2 encapsulation and signaling mechanisms which would need to be supported at the L3RE, even if the physical interfaces are not present on the L3RE itself. Instead of one among many PW types, an L3 routing entity is presented with a common PW type such that a common virtual interface method may be used. In addition, the L3RE is able to use a common signaling method for any type of L2 attachment circuit. The L2SEs that support the native L2 interfaces take the responsibility of performing the interworking function to a common PW type. In some instances, this increases some burden on the L2SE; however, the additional functionality is bounded by the type of native L2 interfaces supported on the L2SE which already supports the necessary L2 signaling mechanisms. The L2SE requires only the signaling and framing interworking for the types of locally attached interfaces Referring now to FIG. 1, a particular embodiment of a system 10 for routing data within a packet-switched network using a L2-L3 IW PW is shown. The system 10 includes a packet-switched network 16, a Layer 2 switching entity (L2SE) device and a Layer 3 routing entity (L3RE1) device in communication via a packet-switched network 16. A customer equipment (CE) device is in communication with a routing instance in L3RE1 device by way of an attachment circuit 26 connected to a PW at the Layer 2 Switching entity (L2SE) device and the PW connected to a virtual interface in the Layer 3 Routing Entity (L3RE1). A CE2 is in communication with the L3RE1 device by way of a second circuit 28 that transports IP frames. The packet-switched network 16 may be realized as an Internet Protocol (IP) network or an MPLS network. Data, in the form of frames, collectively referred to as Protocol Data Units (PDUs), are transported across the network.

A tunnel 20 is established between the L2SE device and the L3RE1 device, the tunnel 20 traversing the packet-switched network 16. A PW 18 is provided within the tunnel 20. The PW 18 is in communication with the L2SE device and the L3RE1 device.

A specific example of data flow through the environment 10 follows. A L3 PDU is L2 encapsulated by the CE1 device and transmitted on the attachment circuit 26. The L2 Protocol Data Unit (PDU) is received at the L2SE device. The L2SE device then converts the L2 PDU to a normalized Pseudowire (PW) PDU. This may include converting a native L2 signaling mechanism used by the CE1 to a normalized PW signaling mechanism used by the L3RE1 and converting the L2 PDU to a bridged PDU capable of transporting a plurality of L3 protocol types. Alternately, this may involve converting to a normalized framing method suitable for transport of Internet Protocol (IP) packets across the PW, and converting the L2 PDU to a PDU having an IP framed format. The state of the L3RE1 virtual IP interface associated with the PW 18 may be synchronized with a state of an attachment circuit 26 on the L2SE using normalized signaling.

The normalized PW PDU is then forwarded to the L3RE1 device. The L3RE1 device may use a virtual interface associated with the PW to forward IP packets onto a network. From this point on, conventional processing takes place. A logical connection is established from the CE1 by way of the attachment circuit 26, L2SE, the PW 18, and tunnel 20 to an IP routing instance in L3RE1. In order for the frame to traverse the packet-switched network 16, the frame may be encapsulated with MPLS labels as described by pseudowire emulation techniques. Alternatively, the frame may be encapsulated within IP tunnels also described by pseudowire emulation techniques. This converts the layer-2 frame to an encapsulated layer-2 packet. The encapsulated frame is sent across the PW 18 within tunnel 20 where it is received by L3RE1, which removes the tunneling encapsulation. L3RE1 terminates the circuit, and treats the circuit as an IP interface. The frame is then forwarded using traditional L3 routing techniques to CE2 (as the destination address of the packet is either CE2 or some IP device behind CE2 reachable via circuit 28.

In a particular example, the CE1 sends an Ethernet frame where the L2 PDU is received by the L2SE device as a framed Ethernet PDU. The L2SE device coverts the framed Ethernet PDU to a normalized PDU. In this instance the L2SE device converts the framed Ethernet PDU to an normalized PDU by stripping off the Ethernet frame. The resulting normalized PDU is then forwarded to the L3RE1 device. The L3RE1 device decapsulates the normalized PDU frame that reveals an IP frame where traditional processing is performed from this point forward for the IP PDU.

In another example, the L2 PDU received by the L2SE device is converted to a normalized PDU which is L2 agnostic. An example of this would be converting the L2-specific PDU to PDU having a Generic Routing Encapsulation (GRE) format. The GRE PDU is then forwarded to the L3RE1 device, and traditional processing is performed from this point forward for the GRE PDU.

Figure 2:
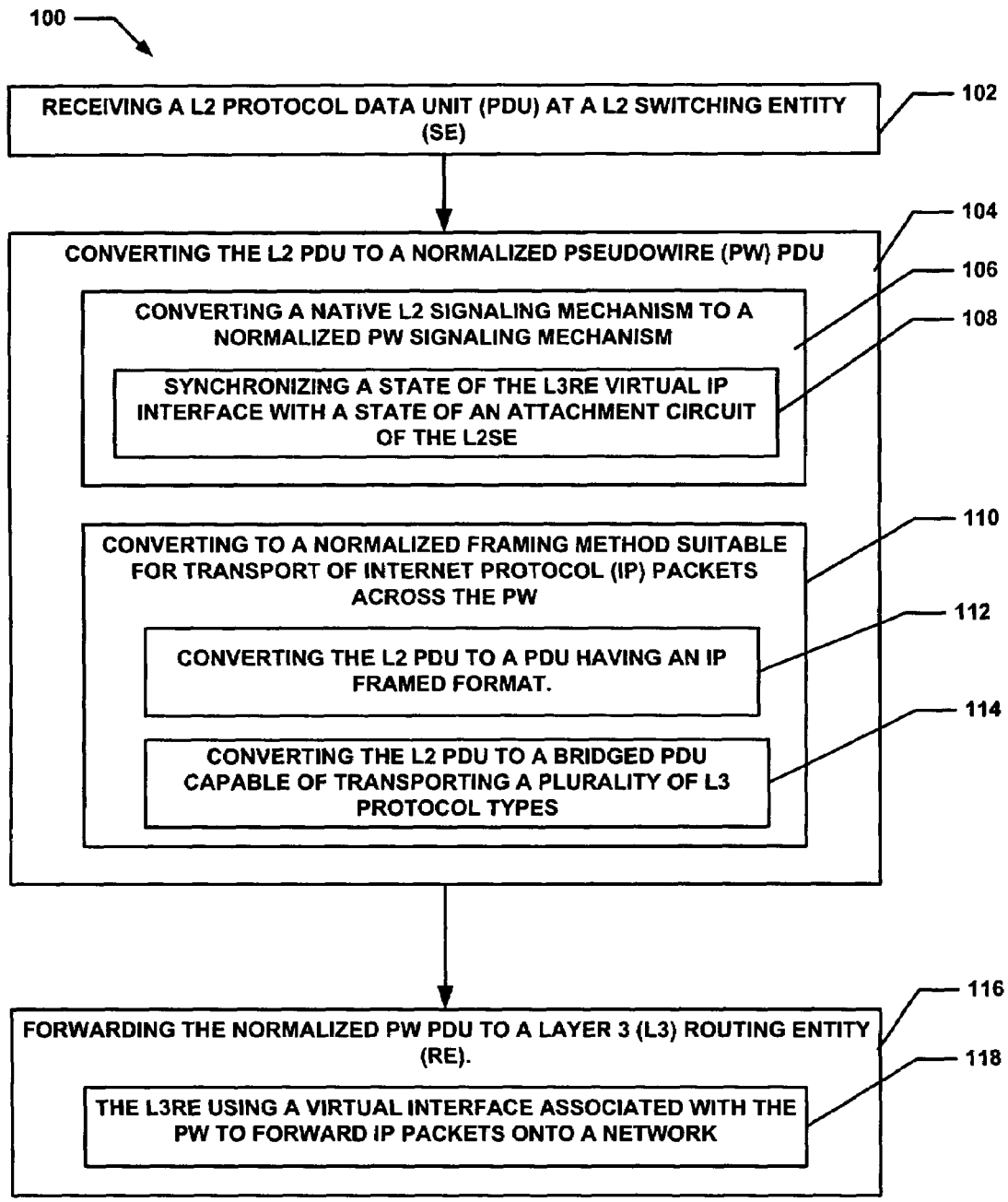
FIG. 2 is a flow diagram of a method of performing L2 interworking to L2-L3 Pseudowires in accordance with embodiments of the invention.

A flow chart of a particular embodiment of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 for performing Layer 2 to L3 (L2-L3) interworking is shown. The method 100 begins with processing block 102 wherein an L2 Protocol Data Unit (PDU) is received at a L2 Switching Entity (SE).

In processing block 104, the L2 PDU is converted to a normalized Pseudowire (PW) PDU. The converting may further involve converting a native L2 signaling mechanism to a normalized PW signaling mechanism as shown in processing block 106. The converting may also include synchronizing a state of the L3RE virtual IP interface with a state of an attachment circuit of the L2SE, as recited in processing block 108.

As shown in processing block 110, the converting of the L2 PDU to a normalized PW may further involve converting to a normalized framing method suitable for transport of Internet Protocol (IP) packets across the PW. This may include, as recited at processing block 112, converting the L2 PDU to a PDU having an IP framed format or, as recited in processing block 114, converting the L2 PDU to a bridged PDU capable of transporting a plurality of L3 protocol types.

In processing block 116 the normalized PW PDU is forwarded to a Layer 3 (L3) Routing Entity (RE) is performed. This may be accomplished by the L3RE using a virtual interface associated with the PW to forward IP packets onto a network. From this point on the traditional processing of the PDU across the rest of the network to the destination device is performed.

Figure 3:
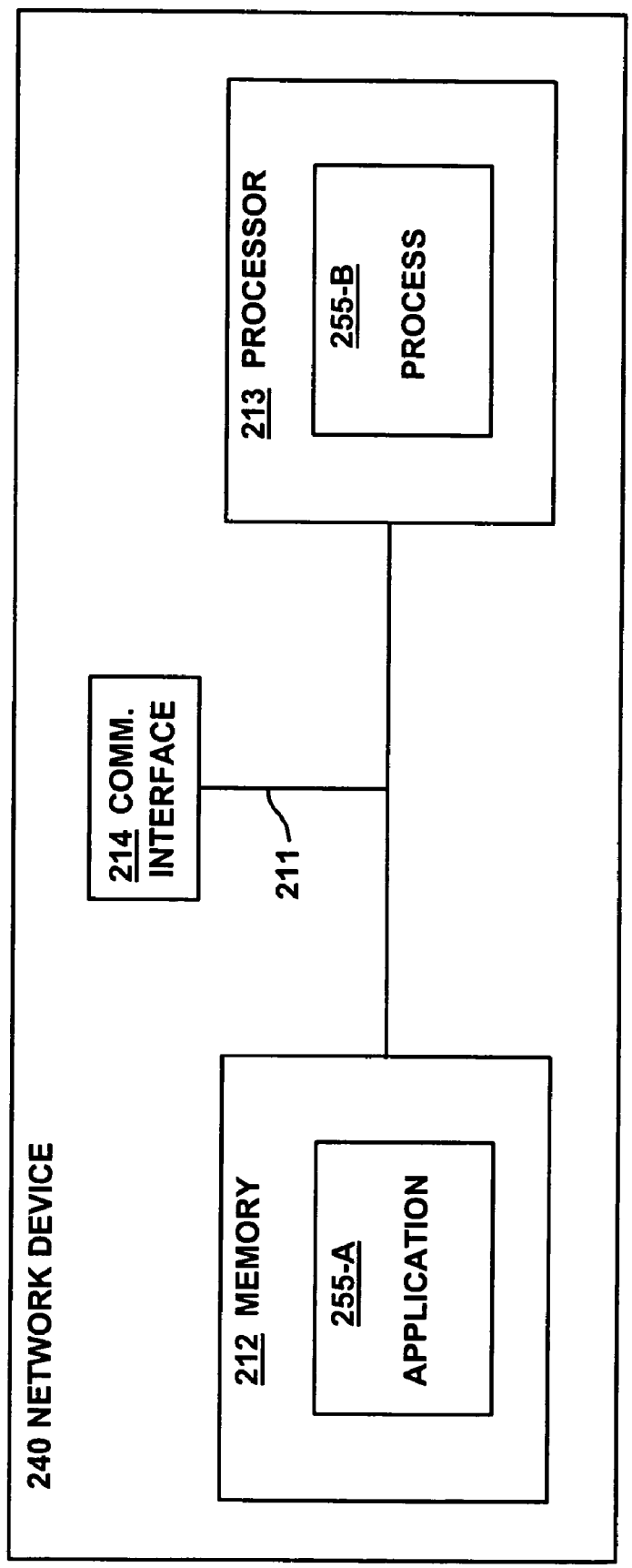
FIG. 3 illustrates an example computer system architecture for a computer system that provide L2 interworking to be applied to L2-L3 Pseudowires in accordance with embodiments of the invention.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. In a network including a Layer 2 Switching Entity (L2SE) in communication with a Layer 3 Routing Entity (L3RE), a method of performing Layer 2 (L2) interworking comprising:
   receiving a L2 Protocol Data Unit (PDU) at said L2SE;
   converting said L2 PDU to a normalized Pseudowire (PW) PDU at said L2SE; and
   forwarding said normalized PW PDU from said L2SE to said L3RE;
   wherein the L3RE includes an edge router which is constructed and arranged to provide a virtual L2 interface; and
   wherein forwarding said normalized PW PDU from said L2SE to said L3RE includes, in an integrated manner, (i) removing tunneling encapsulation from the PW PDU to decapsulate the PW PDU into an Internet Protocol payload and (ii) processing the Internet Protocol payload as a Layer 3 routed packet through the virtual L2 interface.

2. The method of claim 1 wherein said converting said L2 PDU to a normalized PW PDU further comprises converting a native L2 signaling mechanism to a normalized PW signaling mechanism.

3. The method of claim 2 wherein said converting a native L2 signaling mechanism further comprises synchronizing a state of the L3RE virtual IP interface with a state of an attachment circuit of said L2SE.

4. The method of claim 1 wherein said converting further comprises converting to a normalized framing method suitable for transport of Internet Protocol (IP) packets across said PW.

5. The method of claim 1 wherein said converting said L2 PDU to a normalized PW PDU comprises converting said L2 PDU to a bridged PDU capable of transporting a plurality of L3 protocol types.

6. The method of claim 1 wherein said converting said L2 PDU to a normalized PW comprises converting said L2 PDU to a PDU having an IP framed format.

7. The method of claim 1 wherein said forwarding said normalized PW PDU to a L3RE further comprises said L3RE using a virtual interface associated with said PW to forward IP packets onto a network.

8. Software encoded in one or more computer readable tangible medium having computer readable code thereon for performing Layer 2 (L2) interworking, and when executed operable to:
   receive a L2 Protocol Data Unit (PDU) at a L2 Switching Entity (L2SE);
   convert said L2 PDU to a normalized Pseudowire (PW) PDU at said L2SE; and
   forward said normalized PW PDU from said L2SE to a Layer 3 Routing Entity (L3RE);
   wherein the L3RE includes an edge router which is constructed and arranged to provide a virtual L2 interface; and
   wherein said computer readable code, when forwarding said normalized PW PDU to said L3RE, is operable to, in an integrated manner, (i) remove tunneling encapsulation from the PW PDU to decapsulate the PW PDU into an Internet Protocol payload and (ii) process the Internet Protocol payload as a Layer 3 routed packet through the virtual L2 interface.

9. software of claim 8 wherein convert said L2 PDU to a normalized PW PDU is further operable to convert a native L2 signaling mechanism to a normalized PW signaling mechanism.

10. The software of claim 9 wherein convert a native L2 signaling mechanism is further operable to synchronize a state of the L3RE virtual IP interface with a state of an attachment circuit of said L2SE.

11. The software of claim 8 wherein convert said L2 PDU to a normalized PW PDU is further operable to convert to a normalized framing method suitable for transport of Internet Protocol (IP) packets across said PW.

12. The software of claim 8 wherein convert said L2 PDU to a normalized PW PDU is operable to convert said L2 PDU to a bridged PDU capable of transporting a plurality of L3 protocol types.

13. The software of claim 8 wherein convert said L2 PDU to a normalized PW PDU is operable to convert said L2 PDU to a PDU having an IP framed format.

14. The software of claim 8 wherein forward said normalized PW PDU to a L3RE is operable to, for said L3RE, use a virtual interface associated with said PW to forward IP packets onto a network.

15. A network device comprising:
   a memory;
   a processor;
   a communications interface;
   an interconnection mechanism coupling the memory, the processor and the communications interface; and
   wherein the memory is encoded with a Layer 2 (L2) interworking application that when performed on the processor, provides a process for processing information, the process causing the network device to perform the operations of:
   receiving a L2 Protocol Data Unit (PDU) at a L2 Switching Entity (L2SE);
   converting said L2 PDU to a normalized Pseudowire (PW) PDU at said L2SE; and
   forwarding said normalized PW PDU from said L2SE to a Layer 3 Routing Entity (L3RE);

wherein the L3RE includes an edge router which is constructed and arranged to provide a virtual L2 interface; and wherein said processor, when forwarding said normalized PW PDU to said L3RE, is constructed and arranged to, in an integrated manner, (i) remove tunneling encapsulation from the PW PDU to decapsulate the PW PDU into an Internet Protocol payload and (ii) process the Internet Protocol payload as a Layer 3 routed packet through the virtual L2 interface.

16. The network device of claim 15 wherein said converting said L2 PDU to a normalized PW PDU further comprises converting a native L2 signaling mechanism to a normalized PW signaling mechanism.

17. The network device of claim 16 wherein said converting a native L2 signaling mechanism further comprises synchronizing a state of the L3RE virtual IP interface with a state of an attachment circuit of said L2SE.

18. The network device of claim 15 wherein said converting further comprises converting to a normalized framing method suitable for transport of Internet Protocol (IP) packets across said PW.

19. The network device of claim 15 wherein said converting said L2 PDU to a normalized PW PDU comprises converting said L2 PDU to a bridged PDU capable of transporting a plurality of L3 protocol types.

20. The network device of claim 15 wherein said converting said L2 PDU to a normalized PW comprises converting said L2 PDU to a PDU having an IP framed format.

21. The network device of claim 15 wherein said forwarding said normalized PW PDU to a L3RE further comprises said L3RE using a virtual interface associated with said PW to forward IP packets onto a network.

22. A network device performing Layer 2 (L2) interworking comprising:

means for receiving a L2 Protocol Data Unit (PDU) at a L2 Switching Entity (L2SE);

means for converting said L2 PDU to a normalized Pseudowire (PW) PDU including one of a bridged PDU capable of transporting a plurality of L3 protocol types. and a PDU having an IP framed format;

means for converting a native L2 signaling mechanism to a normalized PW signaling mechanism suitable for transport of Internet Protocol (IP) packets across said PW;

means for synchronizing a state of the L3RE virtual IP interface with a state of an attachment circuit of said L2SE; and means for forwarding said normalized PW PDU to a Layer 3 (L3) Routing Entity (RE) using a virtual interface associated with said PW to forward IP packets onto a network;

wherein the L3RE includes an edge router which is constructed and arranged to provide said virtual L2 interface; and wherein said means for forwarding said normalized PW PDU to said L3RE includes, in an integrated manner, (i) means for removing tunneling encapsulation from the PW PDU to decapsulate the PW PDU into an Internet Protocol payload and (ii) means for processing the Internet Protocol payload as a Layer 3 routed packet through the virtual L2 interface.

23. The method of claim 1:
wherein the L2 PDU is a Layer 2 frame;
wherein the normalized PW PDU is an encapsulated Layer 2 packet; and
wherein converting said L2 PDU to a normalized Pseudowire (PW) PDU at said L2SE includes encapsulation with Multiprotocol Label Switching (MPLS) labels.

24. The method of claim 1:
wherein the L2 PDU is a Layer 2 frame;
wherein the normalized PW PDU is an encapsulated Layer 2 packet; and
wherein converting said L2 PDU to a normalized Pseudowire (PW) PDU at said L2SE includes encapsulation within Internet Protocol (IP) tunnels.

25. The method of claim 1:
wherein the L2 PDU is a Layer 2 frame;
wherein the normalized PW PDU is an encapsulated Layer 2 packet; and
wherein converting said L2 PDU to a normalized Pseudowire (PW) PDU at said L2SE includes stripping off an Ethernet frame.

26. The method of claim 1:
wherein the L2 PDU is a Layer 2 frame;
wherein the normalized PW PDU is an encapsulated Layer 2 packet; and
wherein converting said L2 PDU to a normalized Pseudowire (PW) PDU at said L2SE includes conversion to a Generic Routing Encapsulation (GRE) format.

* * * * *